May 2, 1961  J. M. HARRISON  2,982,440
PLASTIC CONTAINER
Filed Feb. 5, 1959
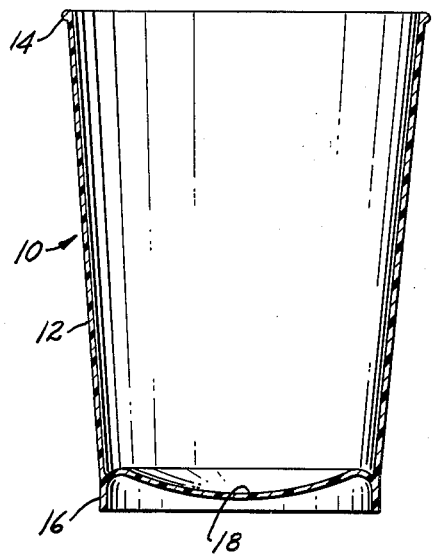
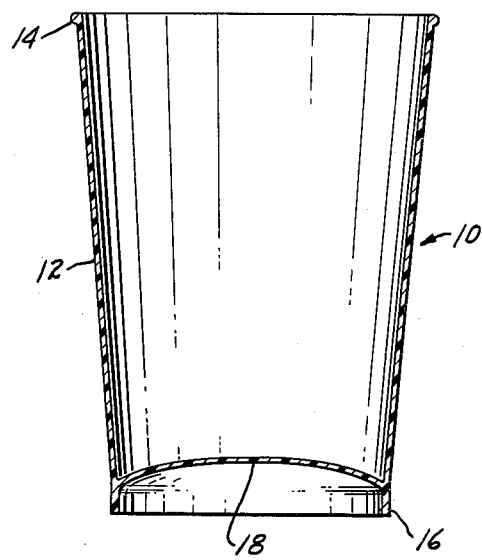
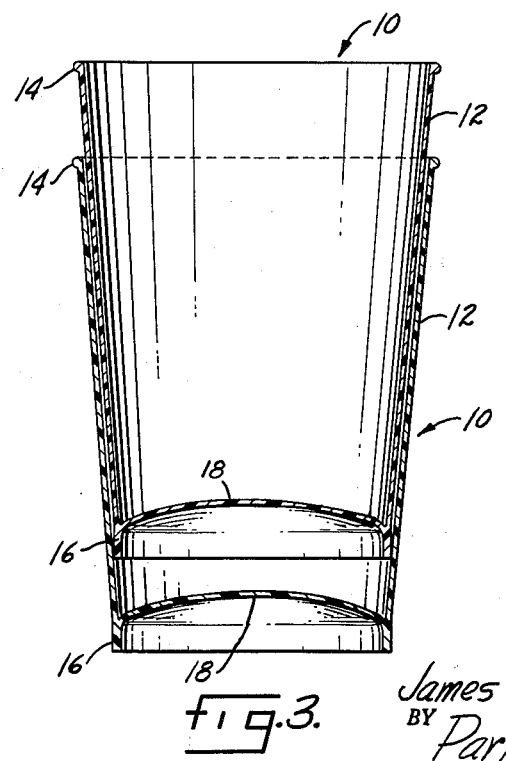
INVENTOR.
James M. Harrison,
BY Parker & Carter
Attorneys.

United States Patent Office 2,982,440
Patented May 2, 1961

2,982,440
PLASTIC CONTAINER

James M. Harrison, Fort Worth, Tex., assignor to Crown Machine and Tool Company, Fort Worth, Tex., a corporation of Texas Filed Feb. 5, 1959, Ser. No. 791,475

3 Claims. (Cl. 220—66)

My invention relates to a container in which food stuffs may be processed and packaged, and in particular relates to a container which may be used to can fruits, vegetables, baby foods, jellies, preserves or the like.

The present practice in the packaging and canning industries is to use straight sided containers such as the common can or to use a glass jar which may have a top diameter or top neck smaller than the bottom diameter. It is very uneconomical to ship containers such as these in an empty condition and therefore it is common practice to have a container factory adjacent the canning plant. My invention relates to a type of container which is made of a light weight synthetic material, which may be transparent, and which has a tapered side wall so that the containers may be nested together resulting in considerable saving in freight space. Such a container provides adequate sealing against infiltration of microbes, germs, or other forms of contamination. My container is also able to withstand the extremely high temperatures necessary for sterilizing and cooking the material in the container.

One purpose of my invention is a container suitable for processing and packaging foodstuffs, such as fruits, vegetables or the like.

Another purpose is a container which may be economically shipped in an empty condition.

Another purpose is a container which can withstand the high temperatures necessary for sterilizing and cooking foodstuffs processed in the container.

During the food processing cycle, the container and contents are first raised to a high temperature after which the container is sealed. Then they are additionally heated and cooked, then allowed to cool to room temperature. Another purpose of my invention then is a container with side walls which will not buckle or distort when a vacuum is created therein due to cooling.

Another purpose is an improved method of canning utilizing a plastic container.

Another purpose is a very lightweight container for processing and packaging foodstuffs.

Another purpose is a container which is very strong and durable but at the same time shatterproof, flexible and inexpensive.

Another purpose is a container which is transparent so the contents may be displayed.

Another purpose is a can type container for packaging foodstuffs which may be directly printed on and no labels are required.

Other purposes will appear in the ensuing specification, drawings and claims.

The invention is illustrated diagrammatically in the accompanying drawings wherein:

Figure 1 is a vertical section of my container before processing;

Figure 2 is a vertical section of my container after food processing and vacuum packing; and Figure 3 is a vertical section showing two of my containers nested together.

Referring now to the drawings, a cylindrical container indicated generally at 10 has a tapered side wall 12, the top of which is formed into an outwardly extending lip 14. The bottom of the side wall 12 may be formed into a suitable cylindrical base 16 which supports the container.

Spaced upwardly from the base 16 is a diaphragm indicated at 18. In Figure 1, which shows the container before processing, the diaphragm 18 is convex or bulges downwardly and there is an excess of material over the amount needed merely to close the bottom of the container.

After the material has been placed in the container and sealed and has been suitably cooked and sterilized, the container is allowed to cool down to room temperature. As the container cools towards room temperature a vacuum is created within it. In order to prevent distortion of the side wall of the container, I have provided an excess of material over that normally needed to cover the bottom. The inward pressure within the container will move the flexible diaphragm upward, as shown in Figure 2, and reduce the vacuum. After the diaphragm has been moved there will no longer be any inward pressure, or very little, on the side wall and so no longer any chance of the wall being distorted or crushed. Some pressure may still exist but not enough to collapse the side walls.

Although not shown in the drawings, it should be understood that the top of the container adjacent the outwardly extending lip 14 may be sealed with a suitable lid. A metallic lid which may be coated with a suitable plastic material, or a lid formed completely of a plastic, or an all-metal lid may be used. The exact details of the lid form no part of the present invention and have not been shown herein.

As shown in the drawings, the diaphragm is formed at the bottom of the container, however, this is not necessary as a container with the diaphragm formed in the lid or at the top is also satisfactory.

In Figure 3 I have shown two empty containers nested together. By tapering the side walls I am able to provide a container which will fit almost completely inside another container. The degree of nesting is determined by the thickness of the side wall and the degree of taper. Or a spacing arrangement, such as in U.S. Patent No. 2,805,790, might be used.

I have found various synthetic materials suitable for forming my container. Materials which are suitable are generally light in weight and may have a specific gravity in the range of 0.9 to 1.1. Of necessity the material used to form a container must be able to withstand the high temperatures commonly used in the cooking and sterilization of foodstuffs. I have found that polypropylene is a suitable substance for forming my container as it meets the specific gravity requirements and it will withstand the necessary high temperatures. Polypropylene has the additional advantage in that it is an extremely tough plastic and, therefore, will provide a container which is almost unbreakable. A low pressure polyethylene is also suitable for certain types of foodstuffs as is polycarbonate. But polypropylene has more general applications.

The plastic substances described above are generally transparent which makes it possible for the customer to examine the packaged foodstuffs through the container. A glass jar will also provide the same advantage, however, glass is breakable, whereas my plastic container is not. In some applications I have found it desirable to add color pigment to the plastic material. This color pigment may be added merely for purposes of decoration, or to make the product look better, or it may be added to keep ultra violet rays out of the material within the container. It has also been found desirable in some applications to coat the inside of the container with a suitable substance which will prevent oxygen permeation and reduce the loss of carbon dioxide in the case of bottled beverages and beer.

A container such as disclosed and described herein may be formed by an injection molding process which is common in the art. Because of construction problems the common can and glass jars conventionally used in packaging and canning are usually cylindrical. However, when an injection molding process is used, the container may be rectangular or square. A container formed by an injection molding process will be completely sealed against the infiltration of microbes, germs or other forms of contamination.

Figure 2 shows the free state or "as molded" state. In other words, the diaphragm or bottom 18 is up when the container comes out of the mold. Prior to filling with foodstuffs, the diaphragm is pressed down to the Figure 3 position by a rod or by hand. The diaphragm has the characteristic that it will stay in the bottom position of Figure 1, a kind of "over center" action. When in the bottom or lower position, the annular hinge connection between the center of the diaphragm and the side wall of the container is sufficiently flexible so that very little thrust is necessary to snap the diaphragm back to the up position of Figure 2. In the down or Figure 1 position, the diaphragm is just barely over center. In short, more thrust is required to push it down than to return it and very little thrust is needed to snap it back up. The annular hinge or joint between the circular diaphragm and the side wall may be thinned or reduced or otherwise formed by serrations or notches or the like so that this snap action will be acquired, in short, an easy return up and a more difficult push down. The center of the diaphragm may be thickened or may be thicker than the annular hinge at the outside, or it may all be the same thickness. But, be that as it may, the bottom or diaphragm should be constructed so that it will stay in the lower position after it has been pushed down, but will return to the up position quite easily.

The importance of this is that when the container and its contents cool, the first part or first small amount of vacuum initially created in the container will cause the diaphragm to pop up. Thus, the side walls will be fully protected at all times and the diaphragm will take up the space created by the vacuum. But at the same time it is important that the diaphragm will stay in the lower or "over center" position without outside help. Thus, the container will stay in the Figure 1 position and may be freely filled without having to be held or otherwise kept in this position during handling and filling.

One of the important aspects of a container of this type is that it may be used in conventional canning equipment without substantial alterations in the machinery. This is to say that a conventional canner may use containers of this type with very few if any changes in his fillers, cappers, etc.

At the present, I have a side wall that is about .017" thick, although it could go down to about .012" or up to about .040". The diaphragm or bottom should be thinner than the side walls, and in the case of .017" side walls, I use a .015" bottom or diaphragm. The entire diaphragm or bottom need not necessarily be thinner at all points than the side walls but the closing or hinge part should.

Another advantage of a container of this type is that it will stand up in the temperatures of a normal canning process, for example, from about 210° F. to 260° F.

A molder would make the container as shown in the Figure 2 arrangement. Prior to shipment, he might press the bottom down and snap it into the Figure 1 position and the containers would be shipped as shown in Figure 3. Or the containers might have the diaphragms up during shipment and be pressed down by the canner. But, be that as it may, when canning takes place, the diaphragm should be down, as in Figure 1.

I have shown the diaphragm as a single bellows or flexing portion, but it should be understood that it might be made of sections or annular rings, one inside the other, so that a differential movement could be acquired. These rings or sections might be made up of thicker portions separated by concentric thinner rings so that one section would move or pop ahead of another.

The use, operation and function of my invention are as follows:

My container may be used in the processing and packaging and more specifically the canning of fruits, vegetables, baby foods, jellies, preserves, and other similar foodstuffs. During the processing and packaging operation it is conventional for the foodstuffs to be placed in the container and cooked and sterilized therein. When this is done the container and foodstuffs are subjected to extremely high temperatures. The container that I have shown and described herein is able to withstand these temperatures when it is formed from one of the plastic or synthetic materials which I have described as suitable.

When the container and foodstuffs are subjected to these extremely high temperatures during the cooking and sterilization cycle there will be an expansion of the material in the container. After the lid is placed on the container and sealed, the container is allowed to cool down to room temperature. During the cooling process a vacuum will be created in the container. By forming the bottom or the top of the container with a diaphragm such as I have shown herein, I have eliminated any buckling or distortion of the container side wall. The diaphragm is a very flexible element and as a vacuum is created within the container the diaphragm will move from its outwardly bulged position such as shown in Figure 1, to the point where it is inwardly curved such as shown in Figure 2. When the diaphragm has so moved it will reduce the vacuum so will prevent buckling or distortion of the side walls.

By using a tapered side wall my container will nest inside other containers. This will cut the space necessary for shipment of the containers to one-tenth of the space ordinarily required for shipping conventional cans or jars. This is of great importance as a medium size canning plant will use one freight car every hour packed with conventional cans. The same freight car packed with my containers would last ten hours.

By manufacturing my container from a light weight material which may have a specific gravity in the range of .9 to 1.1, I can afford a food processor considerable savings in freight. The ratio of the weight of my container to the conventional tin plate container is one to five whereas the ratio of my container to the weight of a glass jar is one to four. For purposes of comparison assume that a thousand cans which are capable of each containing nine fluid ounces will weight eleven pounds. My containers holding the same nine fluid ounces will weight only 2.2 pounds. A medium size canning plant will use approximately 2,475 pounds of cans per hour whereas if they use my containers they would only use 495 pounds of containers. In addition to the reduction in weight and the reduction in shipping space needed to transport my containers, it should be noted that my container may be manufactured for a cost which is comparable to that of the conventional tin can and is less than that of a conventional glass jar.

There are numerous alterations, modifications, and substitutions possible without departing from the scope of the invention. For example, as shown in the drawings the diaphragm is at the bottom of the container however this construction is not necessary as it is also satisfactory to place a diaphragm in the top or the lid of the container. Additionally, my container may be rectangular, square, round or take any shape that can be conveniently formed using plastic materials.

The invention is not limited to the specific details of construction described and illustrated in the accompanying drawings, but covers all modifications coming within the scope of the following claims.

I claim:

1. In a plastic container suitable for canning foods and the like by a process in which a vacuum is formed in the container after it is filled and sealed, the container having a generally circumferentially continuous side wall open at one end and closed at the other, the closed end being closed by an integral end wall connected to the side wall by an integral annular hinge, the end wall having its center portion axially offset relative to the annular hinge in the form of a diaphragm, the diaphragm being capable of flexing either above or below the general plane of the annular hinge and having sufficient stiffness to remain either above or below the plane of the hinge, the annular hinge and end wall being molded with the diaphragm above the general plane of the annular hinge with the hinge molded upwardly and having a normal upward bias so that substantially more thrust is required to force the diaphragm below the plane of the hinge than above, the thrust required to move the diaphragm above the plane of the hinge being small, compared to the thrust required to move the diaphragm below so that the diaphragm will move from below to above almost immediately when vacuum first begins to form in the container thereby fully preventing distortion of the side walls.

2. The structure of claim 1 further characterized in that the container is made entirely of plastic, and wherein the plastic is polypropylene.

3. The structure of claim 1 further characterized in that the side wall of the container is upwardly tapered and open at the top, large end up, the annular hinge and diaphragm being in the bottom wall.

References Cited in the file of this patent

UNITED STATES PATENTS

| | | |
|---|---|---|
| 1,027,430 | Hansen | Jan. 14, 1936 |
| 2,688,995 | Wagoner | Sept. 14, 1954 |
| 2,748,005 | Baier | May 29, 1956 |
| 2,785,986 | Pickens | Mar. 19, 1957 |
| 2,805,790 | Smucker | Sept. 10, 1957 |
| 2,879,917 | Flack | Mar. 31, 1959 |
| 2,894,844 | Shakman | July 14, 1959 |